(12) United States Patent
Curtis et al.

(10) Patent No.: US 8,016,524 B2
(45) Date of Patent: Sep. 13, 2011

(54) TRAILER FOR TRANSPORTING GOLF CARTS AND RECREATIONAL VEHICLES

(75) Inventors: Norman David Curtis, Steinbach (CA);
Douglas B. Thiessen, Winnipeg (CA);
Mario G. Boily, Woodridge (CA)

(73) Assignee: Keystone Western Inc., Ille Des Chenes, Manitoba (CA)

( * ) Notice: Subject to any disclaimer, the term of this patent is extended or adjusted under 35 U.S.C. 154(b) by 236 days.

(21) Appl. No.: 12/273,865

(22) Filed: Nov. 19, 2008

(65) Prior Publication Data

US 2010/0124478 A1  May 20, 2010

(51) Int. Cl.
*B60P 3/06* (2006.01)

(52) U.S. Cl. .......................................................... 410/4

(58) Field of Classification Search .................. 410/3, 4, 410/6, 7, 8, 2, 29
See application file for complete search history.

(56) References Cited

U.S. PATENT DOCUMENTS

| | | | | | |
|---|---|---|---|---|---|
| 415,878 | A | * | 11/1889 | Moore | 105/372 |
| 1,229,714 | A | * | 6/1917 | Clark et al. | 410/18 |
| 2,432,228 | A | * | 12/1947 | De Lano Sidney | 410/26 |
| 2,461,927 | A | * | 2/1949 | Schaldach et al. | 410/26 |
| 2,636,772 | A | * | 4/1953 | Bridge | 410/26 |
| 4,786,222 | A | | 11/1988 | Blodgett | |
| D398,129 | S | * | 9/1998 | Sacks et al. | D34/32 |
| 6,158,798 | A | * | 12/2000 | Stedtfeld et al. | 296/61 |
| 6,205,932 | B1 | * | 3/2001 | Khattab | 105/355 |
| 6,250,874 | B1 | * | 6/2001 | Cross | 414/537 |
| 6,524,055 | B1 | | 2/2003 | Overbye | |
| 6,551,039 | B1 | * | 4/2003 | Forbes | 410/26 |
| D505,238 | S | * | 5/2005 | Robertson | D34/32 |
| 7,309,202 | B1 | * | 12/2007 | Anderson | 414/537 |
| 7,344,184 | B2 | * | 3/2008 | Salvador et al. | 296/183.1 |

\* cited by examiner

*Primary Examiner* — H Gutman
(74) *Attorney, Agent, or Firm* — Adrian D. Battison; Ade & Company Inc (57) ABSTRACT

A semi-trailer for is converted for transporting motorized golf carts and side by side recreational vehicles which are loaded onto the floor and an upper support level with detachable two tier loading ramps and receivers. The upper support level includes transverse shore beams connected to the logistic posts in the side wall of the semi-trailer which then supports and stabilizes a foldable floor system defined by pivotal panels which hinge upwardly into a stored position. The ramps are carried in a rack under the trailer floor.

11 Claims, 9 Drawing Sheets

TRAILER FOR TRANSPORTING GOLF CARTS AND RECREATIONAL VEHICLES

This invention relates to a trailer for transporting vehicles such as golf carts and recreational vehicles (ATVs) where the width of the vehicle to be transported is such that they are too wide to be transported side by side and are sufficiently low in height such that they can be stacked one above another.

BACKGROUND OF THE INVENTION

Manufactures and distributors of golf carts and recreational vehicles ATVs of the type where two passengers sit side by side need a way to economically transport un-crated vehicles of various sizes from their factories to distributors and dealers world wide. These vehicles are generally of the order of 5 feet in width so that they cannot be loaded side by side in a conventional trailer.

Shipping golf carts and larger ATVs from the manufactures to dealers and distributors in semi-trailers and without crating provides significant savings to both the manufactures and dealer/distributor by eliminating the cost of constructing "one time use" crates and substantially reducing freight costs and fuel emissions by transporting double the freight in one haul.

Another benefit of this transportation is that it also eliminates the dealer personnel having to unload crated vehicles using forklifts or similar arrangements. This also can reduce the damage and warranty claims for damages since the equipment transported is available for immediate visual inspection rather than waiting until the equipment is un-crated at the time of sale to a customer.

A standard semi-trailer is 53 ft long, 8 ft 6 inches wide and from floor to ceiling is approx 9 ft 2 inches in height. These dimensions are such that the hauling capacity can be doubled if a multi tier system is installed which provides stacking of un-crated vehicles within the semi-trailer.

It is clear that a dedicated semi-trailer could be modified or constructed with a fixed deck between the floor and roof of the semi-trailer but this prevents the use of the trailer for shipping other general freight than the product for which it is designed and dedicated.

In U.S. Pat. No. 6,524,055 (Overbye) issued Feb. 25, 2003 is disclosed a modification of a trailer for transporting vehicles of this general type in which the trailer includes a plurality of logistics posts along the sides on which are mounted a series of E-bars at spaced positions along the trailer. The E-bars span the trailer and support left, center and right tracks installed along the length of the trailer onto which the vehicles are rolled and are carried. This provides therefore a second row of transportation for the vehicles located above the trailer floor. A ramp structure is provided which allows the vehicles to be rolled into place either on the floor or on the second row. In order to convert the trailer from transporting the vehicles to transporting general cargo, the ramps must be removed and stored.

In U.S. Pat. No. 4,786,222 (Blodgett) issued Nov. 22, 1988 is disclosed a trailer designed for transporting automobiles in two rows.

SUMMARY OF THE INVENTION

It is one object of the invention to provide a trailer for transporting vehicles such as golf carts and wider ATVs.

According to one aspect of the invention there is provided a transport trailer for transporting vehicles comprising:

a trailer body with a floor, two side walls and a roof with a rear opening for loading an interior of the trailer body;

the trailer body being mounted on ground wheels with a front connection for towing of the trailer for transporting cargo contained within the trailer body;

and an apparatus for increasing the load capacity of the trailer body when used transporting golf carts recreational vehicles comprising:

a plurality of upstanding logistic posts at spaced positions along the side walls of the trailer;

plurality of beams connected across the trailer and supported on the posts;

a foldable platform at a height part way between the floor and the roof;

the platform being formed of a plurality of panels;

each panel connected with an outer edge thereof hingedly mounted to a respective one of the side walls of the trailer;

the panels being pivotally movable about a hinge line at the respective side wall;

the panels thus defining an operating position in which the panels extend part way across the trailer to form a horizontal support carried on the beams;

the panels thus defining a stored position in which the panels extend substantially vertically along the respective side wall of the trailer;

and a ramp assembly arranged to extend rearwardly of the rear opening of the trailer to the ground for loading the vehicles;

the ramp assembly being arranged to cooperate with the floor and with the horizontal support formed by the panels for loading the vehicles on the floor and on the horizontal support.

Preferably the panels are arranged such that in the operating position the panels on one side wall meet the panels on the other side wall at the inner edges thereof, thus leaving no open area along the center. However the panels may also be of reduced width so that a space is allowed, provided the space is sufficiently small that the wheels of the vehicles are received on the panels.

Preferably the panels are connected to the respective side wall such that in the stored position the panels extend vertically upwardly along the respective side wall.

Preferably each panel includes a latch to locate the panel at the respective side wall in the stored position.

Preferably the panels are conveniently made of plywood, although other materials such as plastics sheeting can be used.

Preferably the ramp assembly includes a front ramp section, a rear ramp section and a center stabilizer stanchion between the front and rear sections to support a front end of the rear section and a rear end of the front section in an elevated position.

Preferably each of the ramp sections includes a pair of ramp members which are adjustable in spacing to accommodate different wheel spacing of the vehicles.

Preferably the ramp members of the front ramp section are arranged to attach to the truck floor at a rear cross member and to a rear beam of the beams.

Preferably the ramp sections are attached to the center stabilizer stanchion by a safety rod.

Preferably the ramp assembly includes four ramp members which are stored when not in use in a rack under the trailer floor.

Preferably the rack includes front and rear holders arranged to hold the ramp members parallel and side by side with a top surface of each ramp member vertical.

This arrangement described herein thus provides a permanently mounted collapsible elevated floor system, two tier ramp system with adjustable receivers and ramp stabilizers complete with on-board storage rack. This arrangement facilitates the loading, securement and transporting of motorized golf carts and side by side recreational vehicles in conventional semi-trailers used for hauling general freight.

Therefore it is desirable to provide a collapsible floor system that can be readily stored on the walls via a permanent mount hinge system with upper pin lock to secure the collapsible floor while in storage mode, thus allowing the trailer to be used for general freight transportation. With the collapsible floor system being constructed the full width of the trailer on a solid platform it allows for the transportation of various sized vehicles with a max width of 90 inches and overall length of the trailer which is approx 52 feet or on average 26 golf carts verses 13 for conventional transport systems and 10 ATVs verses 5 for the conventional system.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

The invention of the present invention comprises a trailer 10 having a frame not shown on which is mounted a trailer box defined by a floor 11 side walls 12 and a roof 13. These provide an open rear 14 which can be closed by suitable doors as is well known. The trailer includes a hitch arrangement at the forward end and ground wheels 15 for transporting the trailer. Particularly the trailer is a semi-trailer so that the hitch forward end provides a king pin arrangement for attachment to a highway tractor.

In general the transport arrangement of the trailer includes a first row 16 for receiving the vehicles to be transported on the floor 11 and a second row 17 for receiving a further number of the vehicles to be transported carried on a support surface 18 defined by a plurality of panels 19. In addition the system comprises a loading ramp assembly 20 defined by a front ramp section 21, a rear ramp section 22 and a centre stabilizer stanchion 23.

Figure 1:
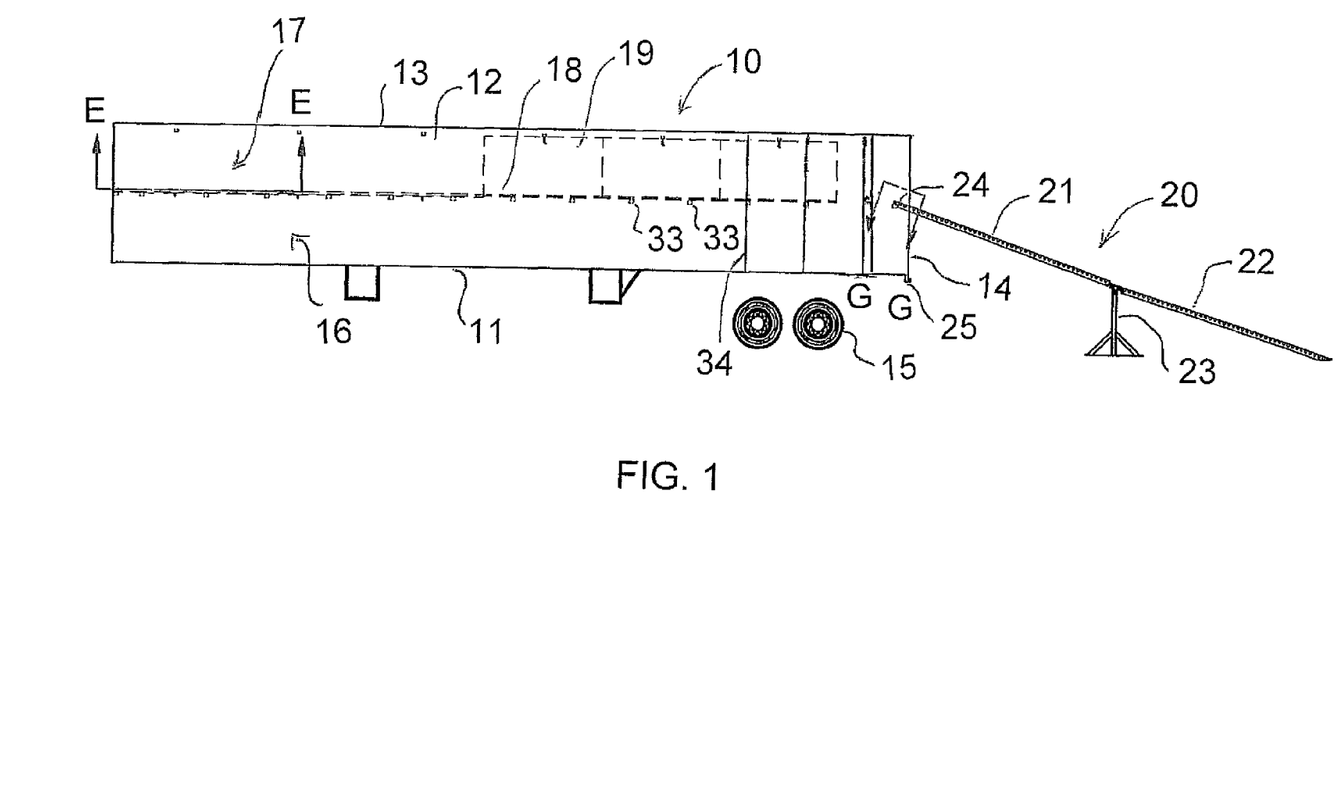
FIG. 1 is a side elevational view of a trailer according to the present invention showing the trailer being loaded to an upper row on a horizontal upper support.
Figure 2:
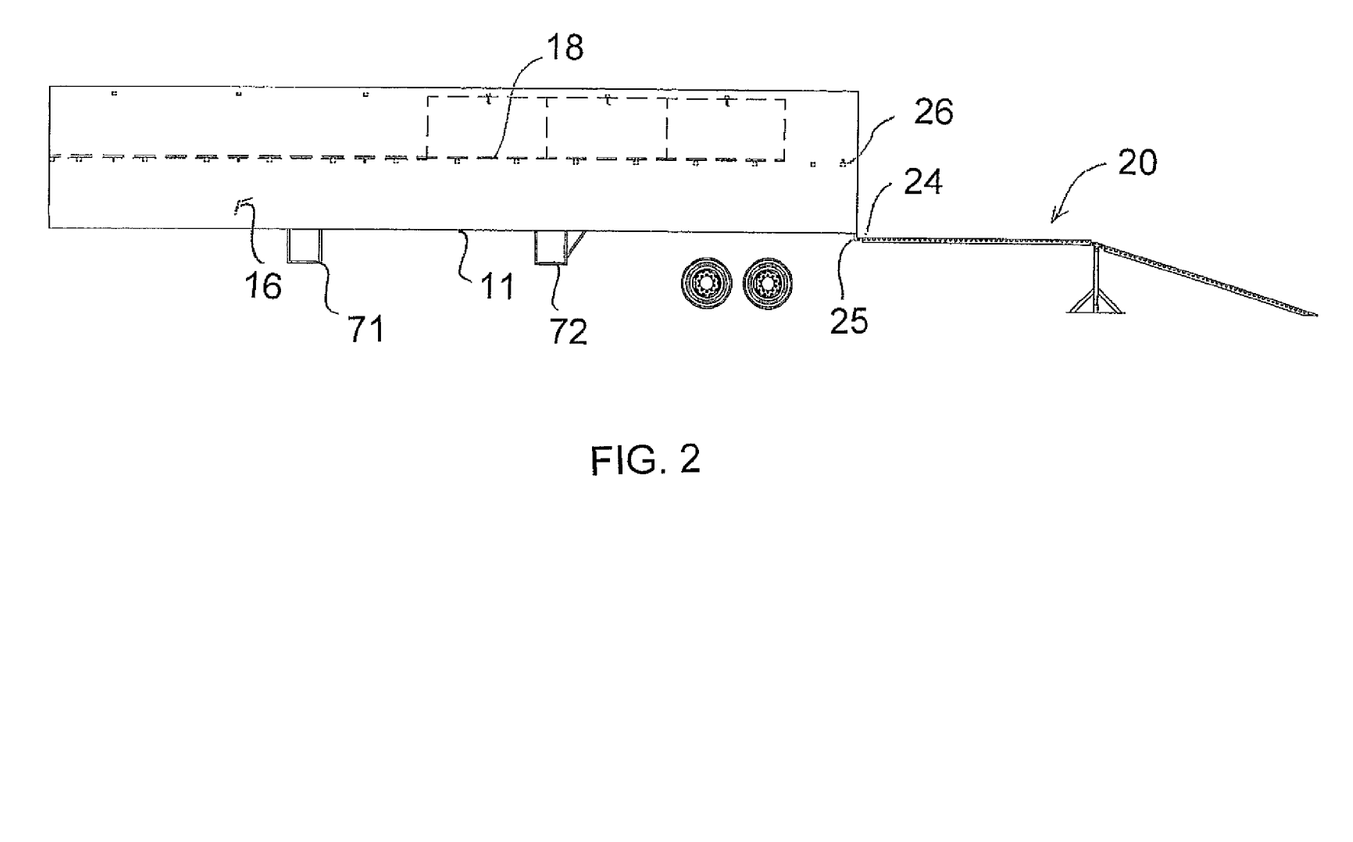
FIG. 2 is a side elevational view of the trailer of FIG. 1 showing the trailer being loaded to a lower row at the floor.
Figure 3:
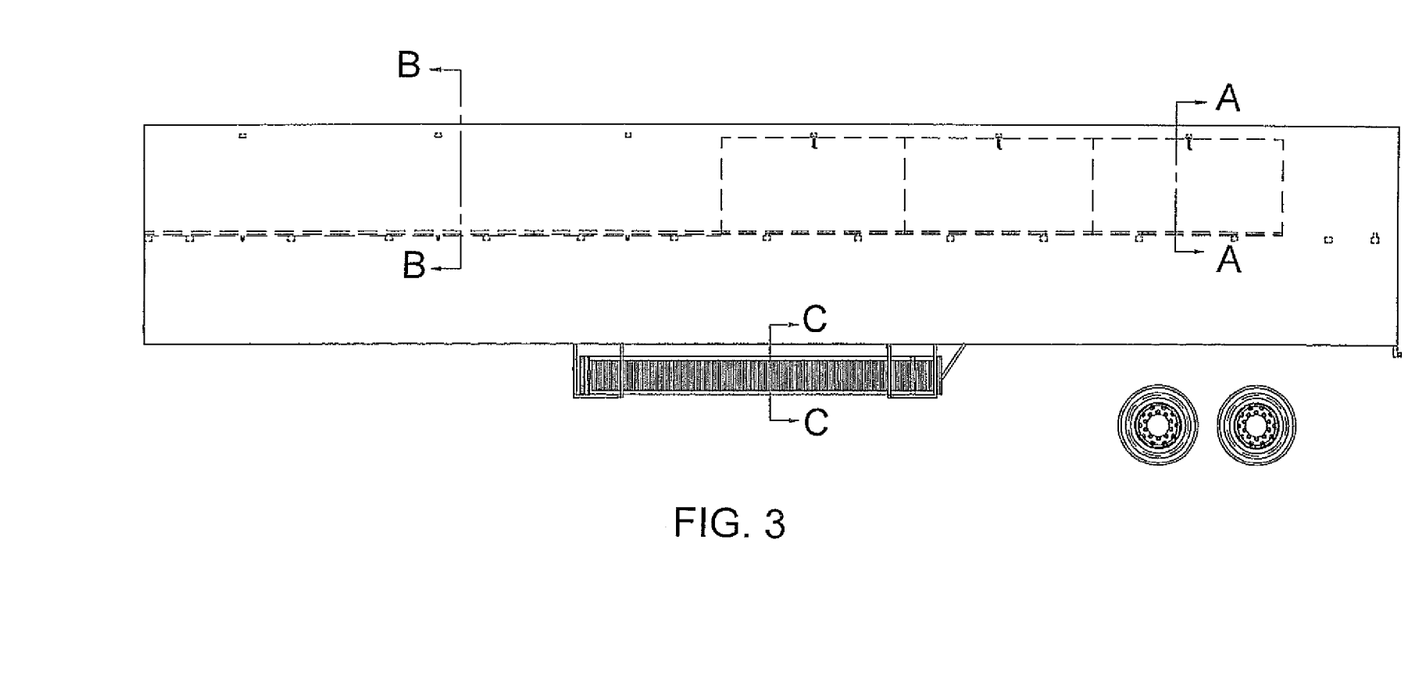
FIG. 3 is a side elevational view of the trailer of FIG. 1 showing the trailer with the ramps in storage position.

In FIG. 1 it will be noted that the ramp assembly is arranged for loading the vehicles onto the upper row 17. In FIG. 2 the ramp assembly 20 is arranged for loading the vehicles onto the lower row 16 that is onto the floor 11. This adjustment is obtained by moving a forward end 24 of the front ramp section from a rear cross member 25 at the floor to a rear beam 26 at the support 18.

Figure 4:
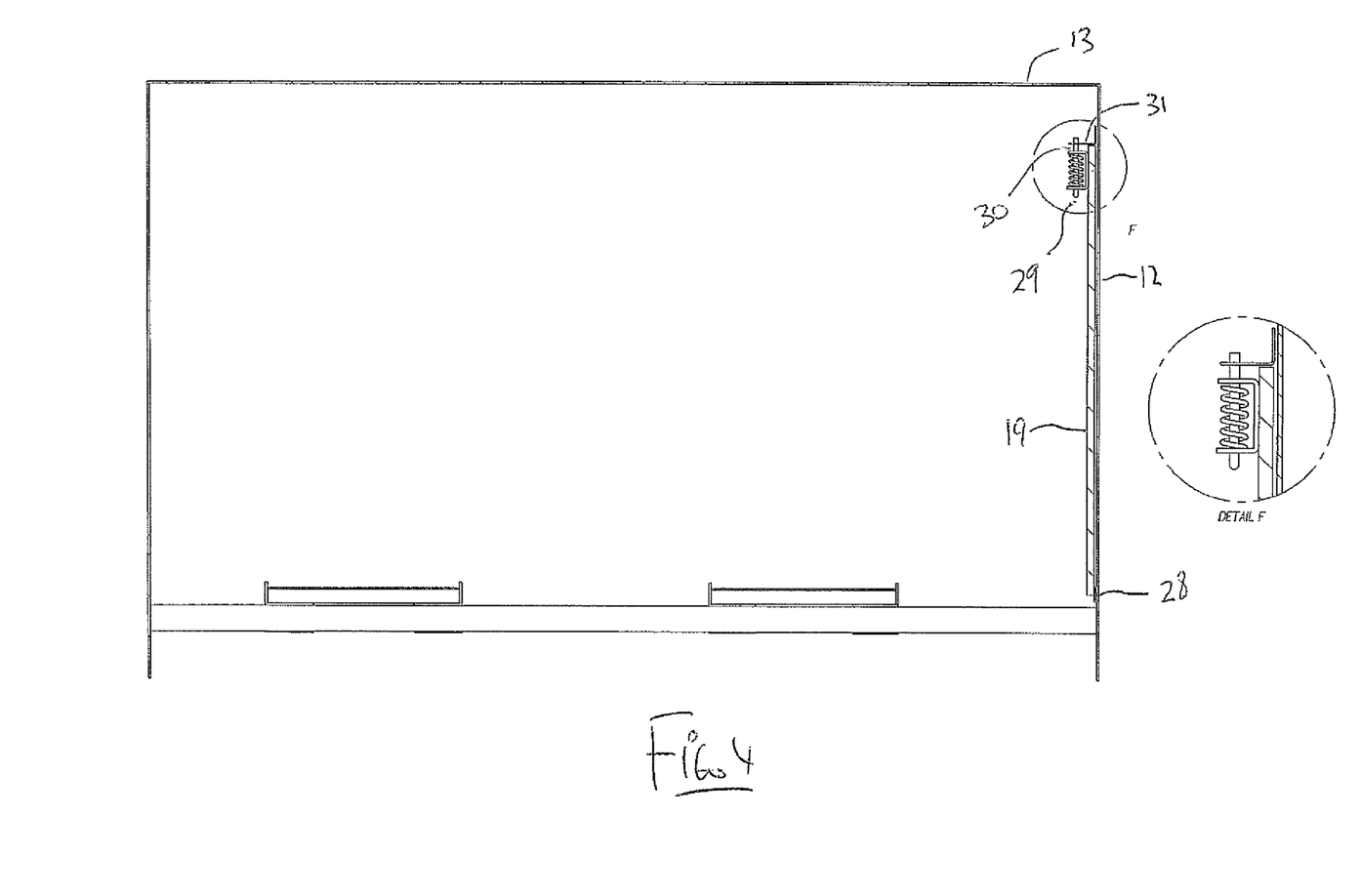
FIG. 4 is a cross sectional view of the trailer taken along the lines A-A of FIG. 3.
Figure 5:
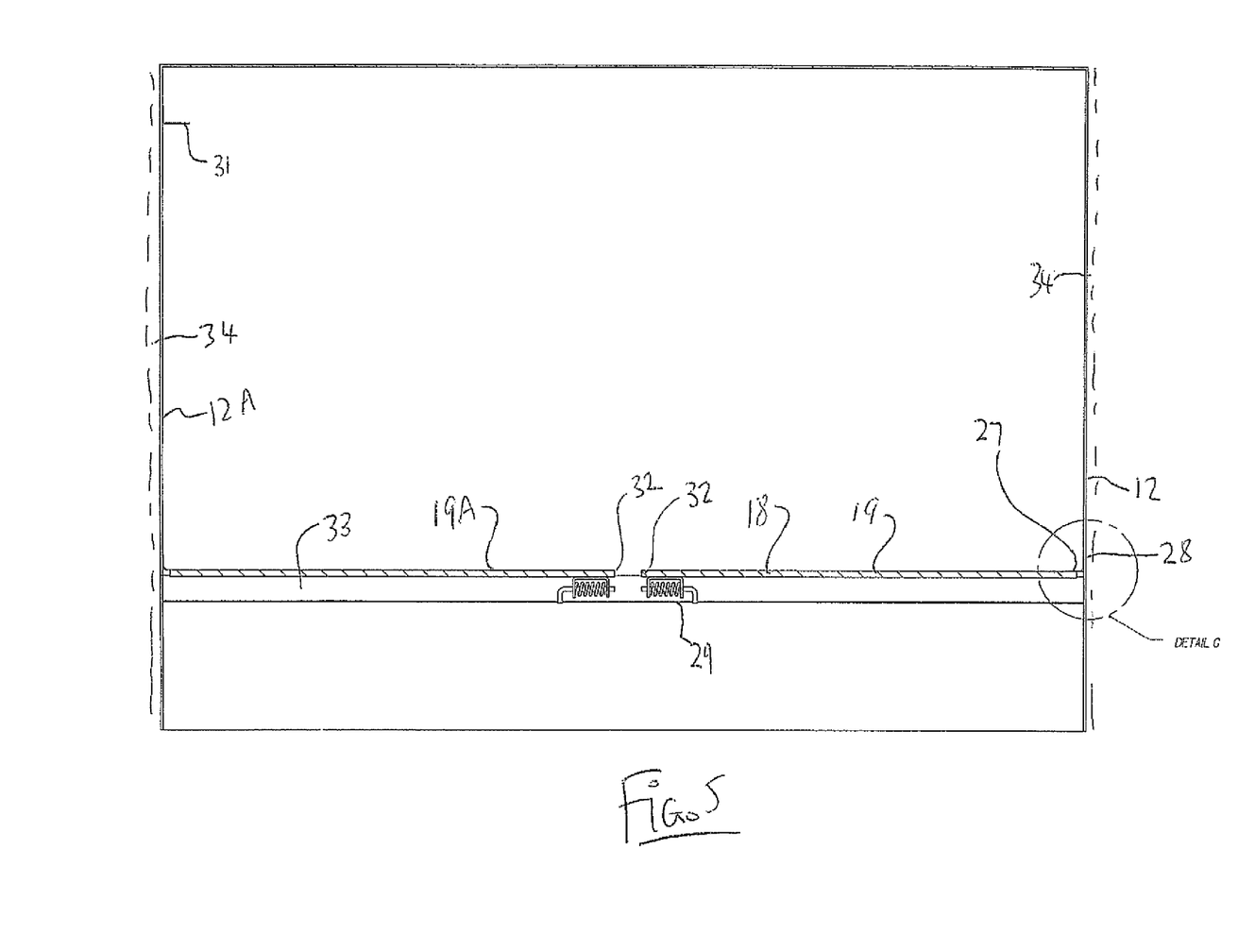
FIG. 5 is a cross sectional view of the trailer taken along the lines B-B of FIG. 3.

As shown in FIGS. 4 and 5, the upper support 18 is defined by panels 19 each of which has an outer edge 27 connected to the side wall 12 of the truck body by a hinge 28. The hinge 28 allows the panel to move from the horizontal position shown in FIG. 5 to a vertical raised position shown in FIG. 4. In the raised position the panel stands along the side wall of the truck body to a position closely adjacent the roof 13. The panel includes a spring latch 29 with a pin 30 which engages into a hole in a flange 31 attached to the side wall 12 adjacent the roof 13. The spring latch 29 is on the underside of the panel. The panels are conventional plywood sheeting of dimensions 4 feet by 8 feet so that an inner edge 32 of the panel 19 lies closely adjacent or meets an inner edge 32 of an opposed panel 19A at the opposite side wall 12A. The panels remain in place in the horizontal position simply by gravity and the latches 29 are not used in the lowered operating position shown in FIG. 5. The panels are carried on a series of transverse beams 33 at spaced positions along the truck body. Each of these beams spans across the width of the truck body and is supported at its ends on a plurality of logistics posts 34 also at spaced positions along the truck body.

Such logistic posts are well known in the trucking industry and trucks are suitably supplied when required containing the logistics posts. These posts are structural members which provide a supporting structure for attachment of transverse beams or bars which can be located at various heights along the posts. These are conventionally used to engage or locate cargo within the truck box. Thus the posts each have a series of slots or holes into which the ends of the beams can be engaged to support the beam at a required height.

In this embodiment the beams 33 are located approximately at mid height of the truck box and a full set of beams is provided which extends across each of the pairs of posts along the length of the truck body.

Figure 10:
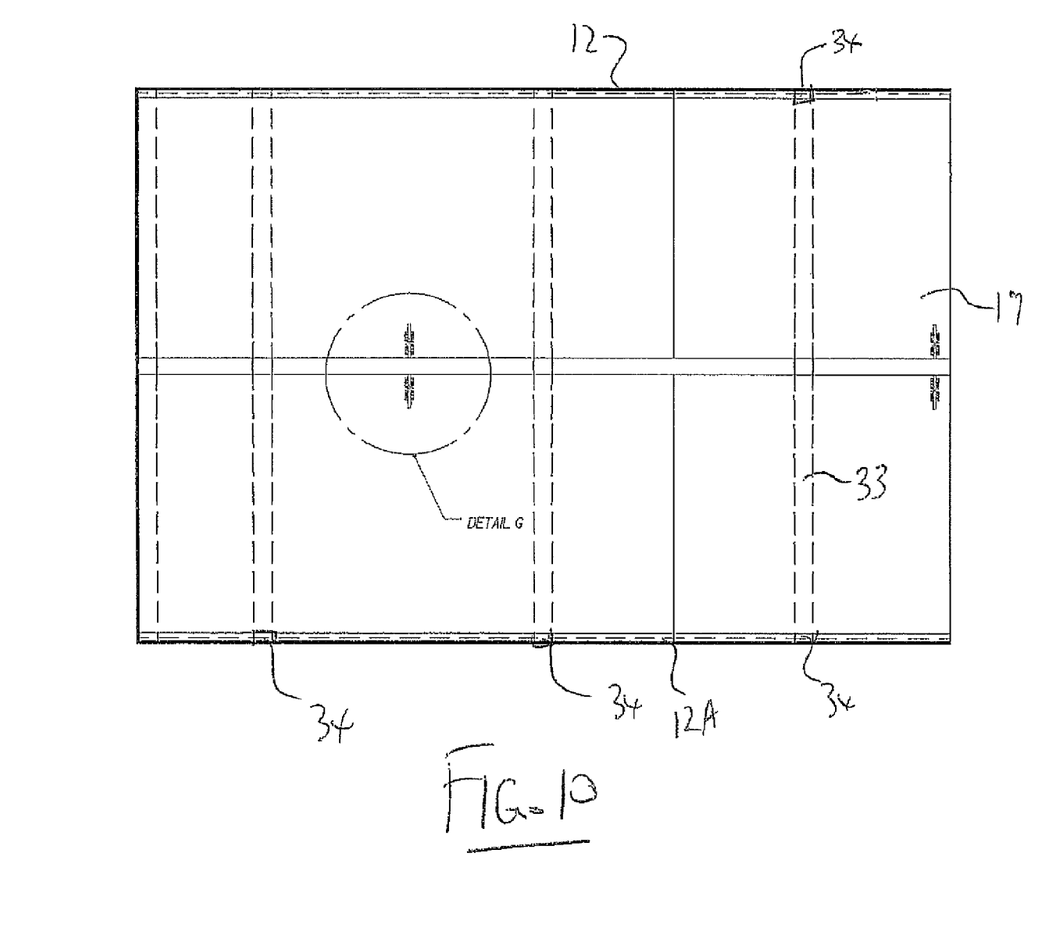
FIG. 10 is a cross sectional view of the trailer showing the panels of FIG. 1.

With the beams in place, the panels 19 can be pivoted simply downwardly to lie over the beams and they are supported thereby to form a subsidiary floor or support surface at a raised position relative to the floor 11. A plan view of the subsidiary floor is shown in FIG. 10 where the transverse beams 33 can be seen attached to the logistics posts 34 in the side walls 12 and 12A.

Figures 7, 8, 9:
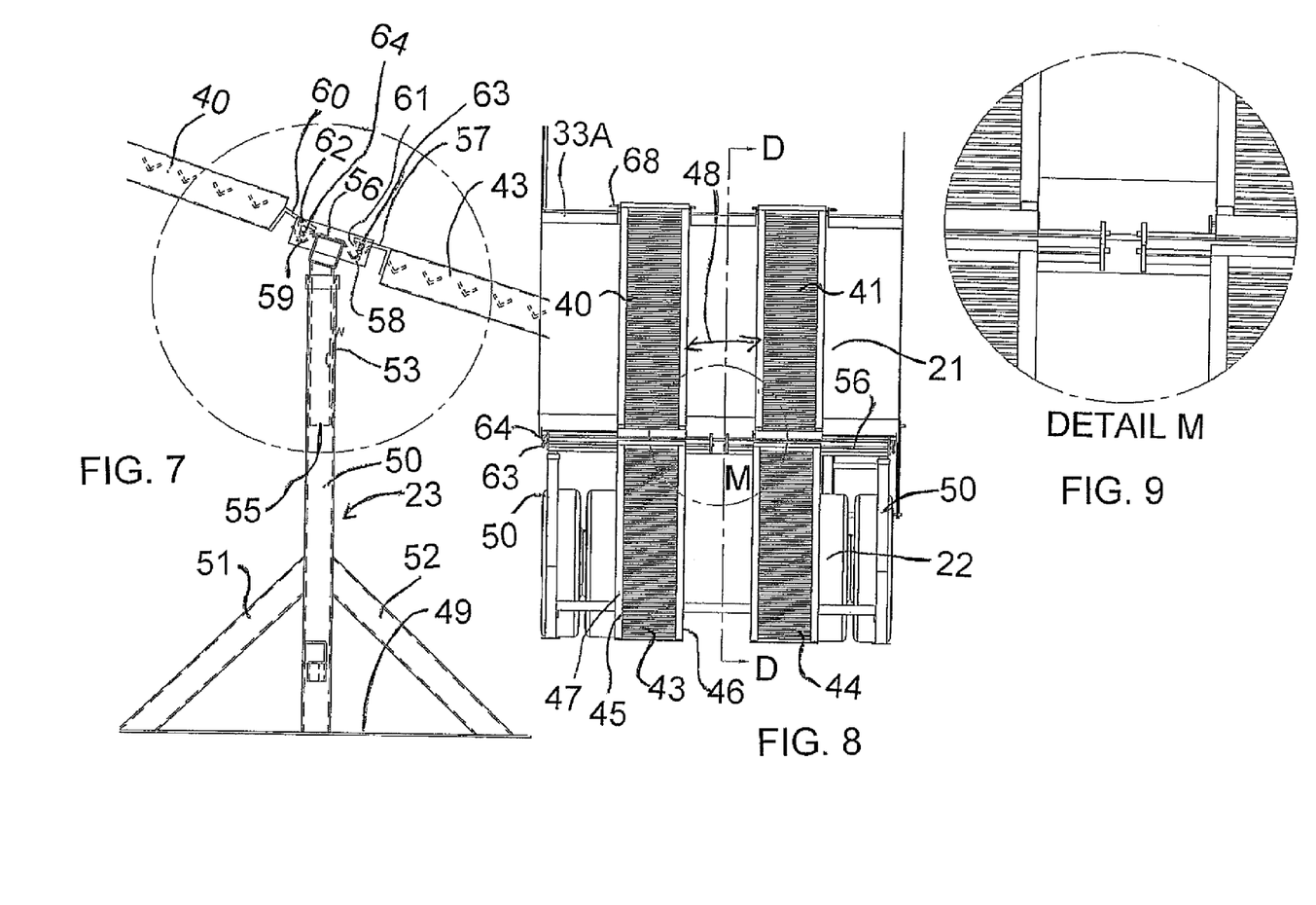
FIG. 7 is a side elevational view of the trailer of the center stabilizer stanchion of FIG. 1.
FIG. 8 is a rear elevational view of the trailer of FIG. 1.
FIG. 9 is a plan view of the connection between the ramps and the center stabilizer stanchion of FIG. 7.

The ramp assembly best visible in FIGS. 7, 8 and 9 comprises an upper ramp section 21 defined by a pair of ramp members 40 and 41. The lower ramp section 22 is also defined by a pair of ramp members 43 and 44. Each of the ramp members is of a conventional construction defined by side beams 45 and 46 together with a plurality of transverse slats 47. The width of the ramp members is sufficient to receive the wheel of the vehicle to be loaded. The spacing 48 between the ramp members of the upper and lower sections can be adjusted by moving the ramp members inwardly and outwardly across the central stabilizer stanchion 23 and across the rear of the truck body.

The central stanchion 23 comprises a base 49 for resting on a suitable floor surface together with a pair of upstanding legs 50 at spaced positions across the base 49. Each of the legs 50 is braced by front and rear braces 51, 52 so as to be supported in vertical position when the base 49 sits in horizontal position on the ground. The height of the stanchion can be adjusted by sliding an inner tube 53 upwardly and downwardly with respect to the leg 50 and by locking the tube 53 at a required height 55 within the tube defined by the leg. Thus an upper transverse beam 56 of the stanchion is supported at a required height relative to the ground. As best shown in FIG. 7, the upper end of the lower ramp member 43 carries a flange 57 for engagement with a receptacle 58 on the rear side of the beam 56. Symmetrically a receptacle 59 is provided on the upper side of the beam 56 for receiving a flange 60 of the upper ramp member 40.

The flanges 57 and 60 carry a tubular receiving portion 61, 62 into which a respective pin 63, 64 can be received acting to lock the respective flange to the respective receptacle 58 and 59. Thus when the pins 63, 64 are inserted, the ramp members are fixed to the stanchion and are prevented against falling from the stanchion.

As shown in FIGS. 1 and 2, the stanchion is adjusted in height so that the first ramp section at the lower end extends from the ground to a height approximately equal to the floor 11. The upper ramp section then extends from the stanchion to the truck and in the loading position where it is loading the floor, the upper ramp section is generally horizontal. This allows the upper ramp section to be inclined upwardly to the upper loading row from the top of the stanchion 23 at an angle which is approximately equal to the angle of the lower ramp section.

Figures 11, 12:
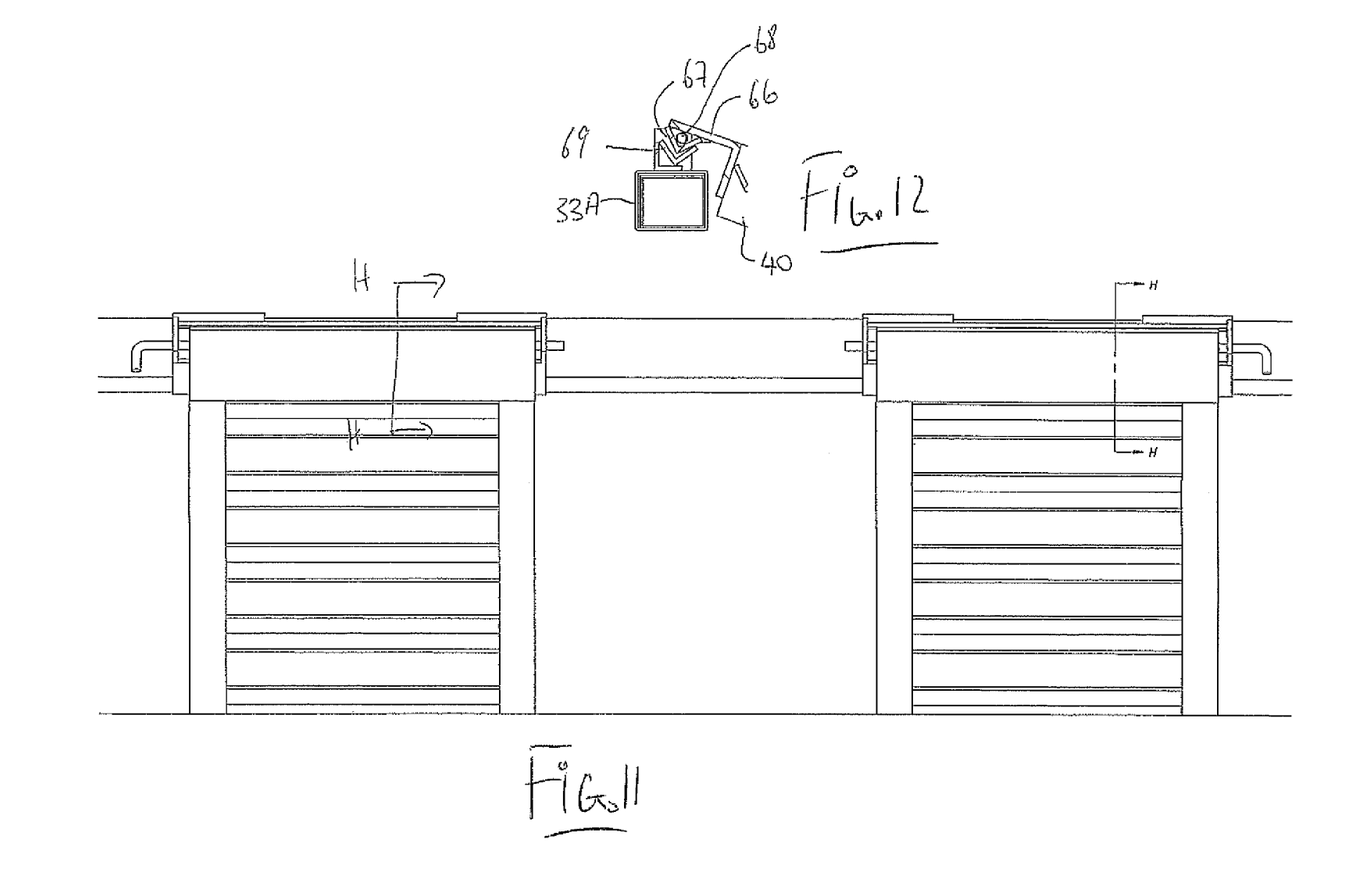
FIG. 11 is a cross sectional view of the trailer taken along the lines G-G of FIG. 1.
FIG. 12 is a cross sectional view taken along the lines H-H of FIG. 11.

As shown in FIGS. 11 and 12 a symmetrical latching arrangement is provided at the rear of the truck relative to the latching arrangement at the top of the stanchion 23. Thus the upper end of the upper ramp member 40 has also a flange 66 symmetrical to the flange 60 together with a receiving portion 67 symmetrical to the receiving portion 62. This allows a pin 68 to engage through the receiving portion from the receptacle 69 on the rear most one of the beams 33 as indicated at 33A. Thus again the receiving portion 67 sits in the receptacle 69 and is latched in place by the transverse pin 68.

In this way the spacing between the ramp members can be adjusted by sliding the ramp members horizontally across the stanchion and across the rear beam of the truck. The width of the pin and the width of the receptacle is such that the movement across the width of the truck is sufficient to accommodate the difference in wheel spacing of the various vehicles to be loaded.

Although not shown, a symmetrical mounting arrangement is provided on the rear cross member 25 at the floor of the truck.

Figure 6:
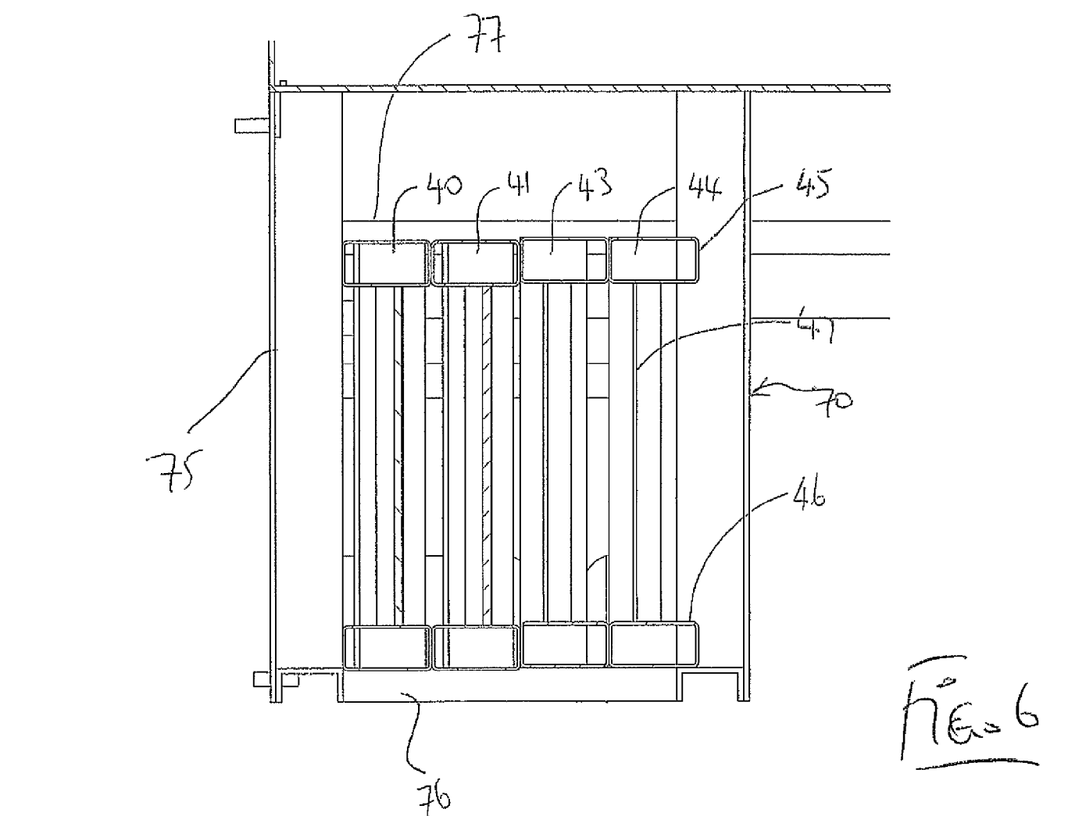
FIG. 6 is a cross sectional view of the trailer taken along the lines C-C of FIG. 3.

Turning now to FIG. 6, each of the four ramp members 40, 41, 43 and 44 if carried in a rack 70 defined by front and rear rack members 71 and 72. The ramp members are carried in vertical orientation so that the slats 47 stand vertically with the side beams 45 and 46 at top and bottom respectively of the slats. The rack defines a receiving area equal to the dimensions of the four rack members arranged side by side. A front cover portion 75 is inserted over the rack members when they are mounted in place on a bottom horizontal receiving rail 76 and confined by a top receiving rail 77. Thus the racks ramp members are held fixed in place within the rack and clamped in position by the front cover 75 so that they extend along one side of the truck body underneath the frame of the truck body and underneath the floor 11 with the ramp members extending partly along the side of the truck body. The stanchion 23 after the ramp members have been removed can simply be stored inside the truck box alongside the vehicles stored therein.

While the truck body is thus suitably configured to transport two rows of the vehicles, it can simply and quickly be modified to transport conventional cargo by lifting the panels 19 to the upward stored position alongside the side walls and removing those of the transverse beams 33 that are required to allow the insertion and placement of the cargo to be transported. In the event that all of the beams are to be removed, the total number of beams can be stored simply within the interior of the truck body with the stanchion. When thus stored, preferably at the forward end of the truck, the remaining open area of the truck body is available substantially wholly between the side walls and between the floor and the ceiling for receiving the conventional cargo to be transported.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A transport trailer for transporting vehicles comprising:
a trailer body with a floor, two side walls and a roof with a rear opening for loading an interior of the trailer body;
the trailer body being mounted on ground wheels with a front connection for towing of the trailer for transporting cargo contained within the trailer body;
and an apparatus for increasing the load capacity of the trailer body when used for transporting golf carts or recreational vehicles, the apparatus comprising:
a plurality of upstanding logistic posts at spaced positions along the side walls of the trailer;
a plurality of beams each beam spanning across the trailer and removably supported on the posts;
a foldable platform at a height part way between the floor and the roof;
the platform being formed of a plurality of panels;
each panel connected with an outer edge thereof hingedly mounted to a respective one of the side walls of the trailer;
the panels being pivotally movable about a hinge line at the respective side wall;
the panels thus defining an operating position in which the panels extend part way across the trailer to form a horizontal support carried on the beams;
the panels thus defining a stored position in which the panels extend substantially vertically along the respective side wall of the trailer;
the panels being separate from the beams and hinged at the outer edge thereof to the respective side wall such that the panels are movable to the stored position while the beams remain connected across the posts;
and a ramp assembly arranged to extend rearwardly of the rear opening of the trailer to the ground for loading the vehicles;
the ramp assembly being arranged to cooperate with the floor and with the horizontal support formed by the panels for loading the vehicles on the floor and on the horizontal support.

2. The transport trailer according to claim 1 wherein the panels are arranged such that in the operating position the panels on a first one of the side walls meet the panels on a second one of the side walls at the inner edges thereof.

3. The transport trailer according to claim 1 wherein the panels are connected to the respective side wall such that in the stored position the panels extend vertically upwardly along the respective side wall.

4. The transport trailer according to claim 3 wherein each panel includes a latch to locate the panel at the respective side wall in the stored position.

5. The transport trailer according to claim 1 wherein the panels are made of plywood.

6. The transport trailer according to claim 1 wherein the ramp assembly includes a front ramp section, a rear ramp section and a center stabilizer stanchion between the front ramp section and the rear ramp section to support a front end of the rear ramp section and a rear end of the front ramp section in an elevated position.

7. The transport trailer according to claim 6 wherein each of the ramp sections includes a pair of ramp members which are adjustable in spacing to accommodate different wheel spacing of the vehicles.

8. The transport trailer according to claim 7 wherein the ramp members of the front ramp section are arranged to attach to the truck floor at a rear cross member and to a rear beam of the beams.

9. The transport trailer according to claim 6 wherein the ramp sections are attached to the center stabilizer stanchion by a safety rod.

10. The transport trailer according to claim 1 wherein the ramp assembly includes four ramp members which are stored when not in use in a rack under the trailer floor.

11. The transport trailer according to claim 10 wherein the rack includes front and rear holders arranged to hold the ramp members parallel and side by side with a top surface of each ramp member held in a vertical orientation.

* * * * *